Figure 1:
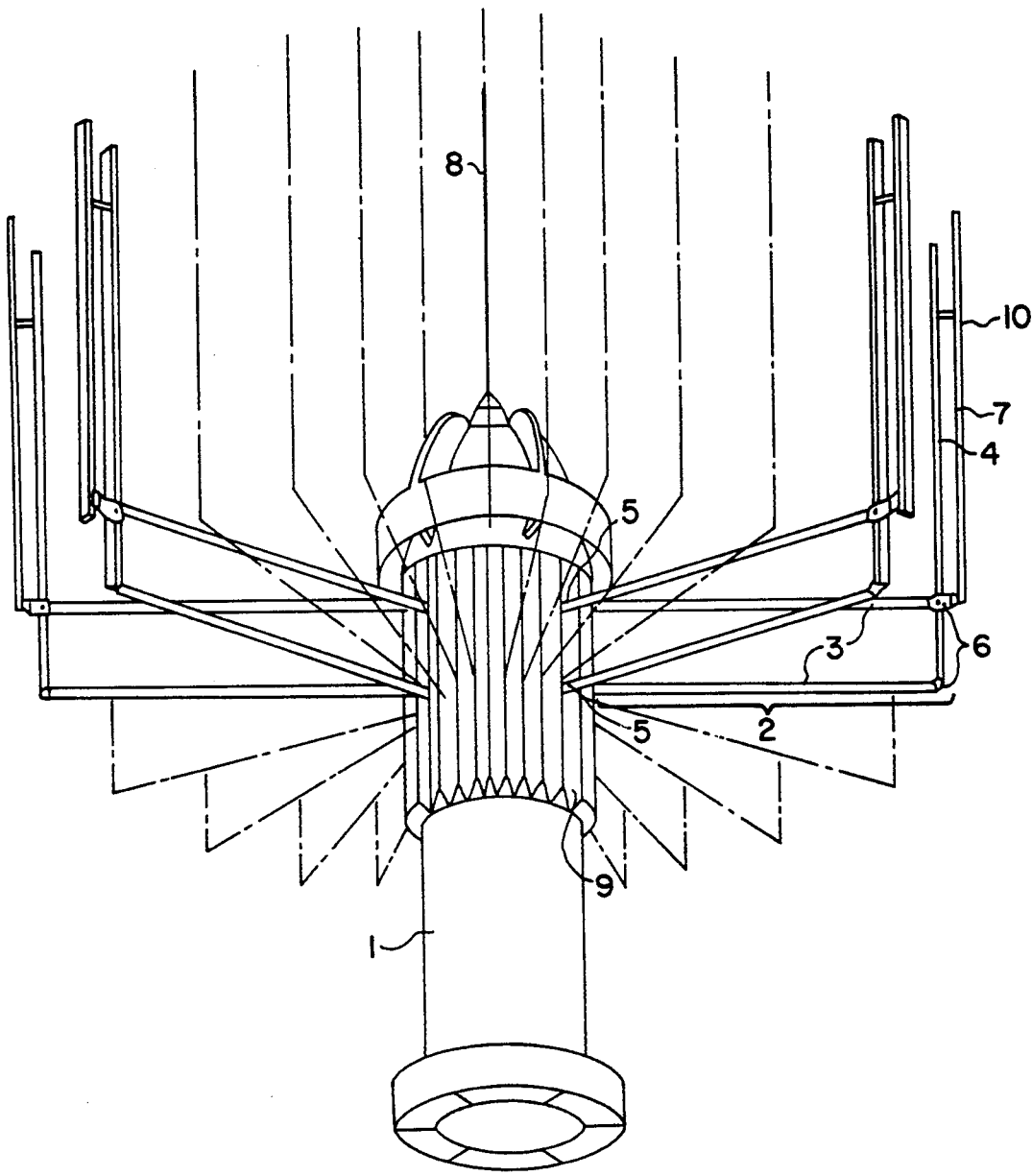

United States Patent [19]

Lemer et al.

[11] Patent Number: 5,319,612
[45] Date of Patent: Jun. 7, 1994

[54] UNFOLDING CYLINDRICAL SONAR

[75] Inventors: Alain Lemer, Bagneux; Guy Riccardi, Sceaux, both of France

[73] Assignee: Thomson-CSF, Paris, France

[21] Appl. No.: 353,642

[22] PCT Filed: Sep. 25, 1987

[86] PCT No.: PCT/FR87/00367
§ 371 Date: Jun. 1, 1993
§ 102(e) Date: Jun. 1, 1993

[87] PCT Pub. No.: WO88/02535
PCT Pub. Date: Apr. 7, 1988

[30] Foreign Application Priority Data

Sep. 26, 1986 [FR] France .................... 86 13485

[51] Int. Cl.⁵ .................... G01S 3/80; G10K 11/00
[52] U.S. Cl. ........................ 367/124; 367/153
[58] Field of Search ............. 367/4, 165, 173, 124, 367/126, 153; 248/284

[56] References Cited

U.S. PATENT DOCUMENTS

| | | | |
|---|---|---|---|
| 3,665,380 | 5/1972 | Stover | 367/126 |
| 3,886,491 | 5/1975 | Jonkey et al. | 367/173 |
| 3,931,607 | 1/1976 | Ingram | 367/126 |
| 4,661,938 | 4/1987 | Jones et al. | 367/153 |
| 5,014,953 | 5/1991 | Warnan et al. | 248/284 |

FOREIGN PATENT DOCUMENTS

| | | |
|---|---|---|
| 409960 | 5/1975 | Australia . |
| 0232071 | 8/1987 | European Pat. Off. . |
| 702103 | 4/1938 | Fed. Rep. of Germany . |
| 2093996 | 9/1982 | United Kingdom . |

Primary Examiner—Daniel T. Pihulic
Attorney, Agent, or Firm—Cushman, Darby & Cushman

[57] ABSTRACT

Sonars provided with an acoustically transparent antenna. In a sonar comprising deployable arms (2) provided with columns (4) distributed on a cylindrical surface, the invention provides for the doubling of said columns (7) situated at a small distance from the first columns and for the association of signals from hydrophones mounted in the columns so as to obtain for each pair of columns a cardioid characteristic simulating a baffled antenna. The invention makes possible the suppression of the rear lobe of an acoustically transparent antenna.

2 Claims, 2 Drawing Sheets

UNFOLDING CYLINDRICAL SONAR

The present invention relates to unfolding, cylindrical sonars which can be used, for example, from a helicopter.

There is a method, known from the French patent No. 2 354 920, for making a sonobuoy comprising, on a body, a set of unfolding arms fitted with hydrophones When the buoy is released, the arms are folded against the body, thus facilitating its entry into the water and preventing these arms from being pulled off. When it is stabilized in water, at the desired depth, the arms get unfolded to give a cylindrical monitoring base with a diameter that is appreciably greater than the body of the buoy A sonobuoy of the same type is also known from the patent GB-A-2 093 996, comprising, on each unfolding arm, five columns of hydrophones separated by a distance of $\lambda/2$ to increase sensitivity in reception. This spacing does not provide the characteristics of particular directivity. The electronic processing of the signals received by the hydrophones of each arm enable the localizing of the noise sources, for example, submarines. However, a cylindrical arrangement of this type, which is necessarily transparent owing to the structure of the device, is at the origin of a certain number of drawbacks, in particular ambiguities in detection and localization arising out of the minor lobes and the rear lobe of the different hydrophones.

To overcome these drawbacks, the invention proposes a sonar according to claim 1.

Figure 2:
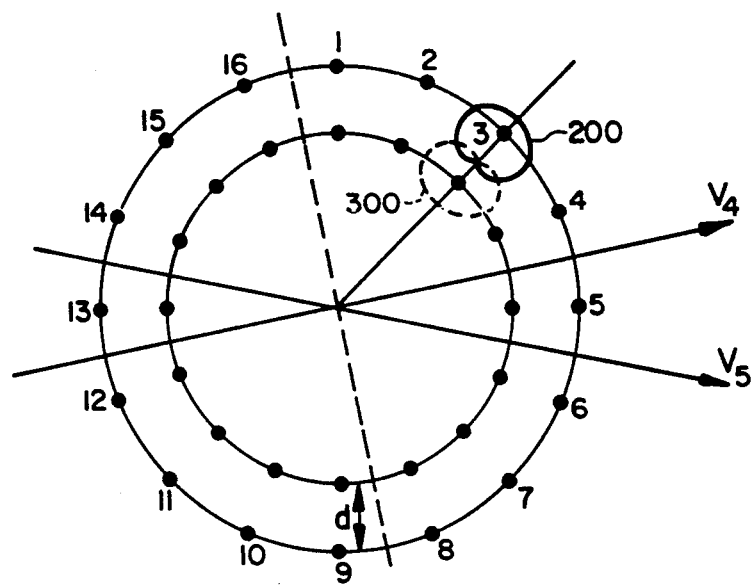
Figure 3:
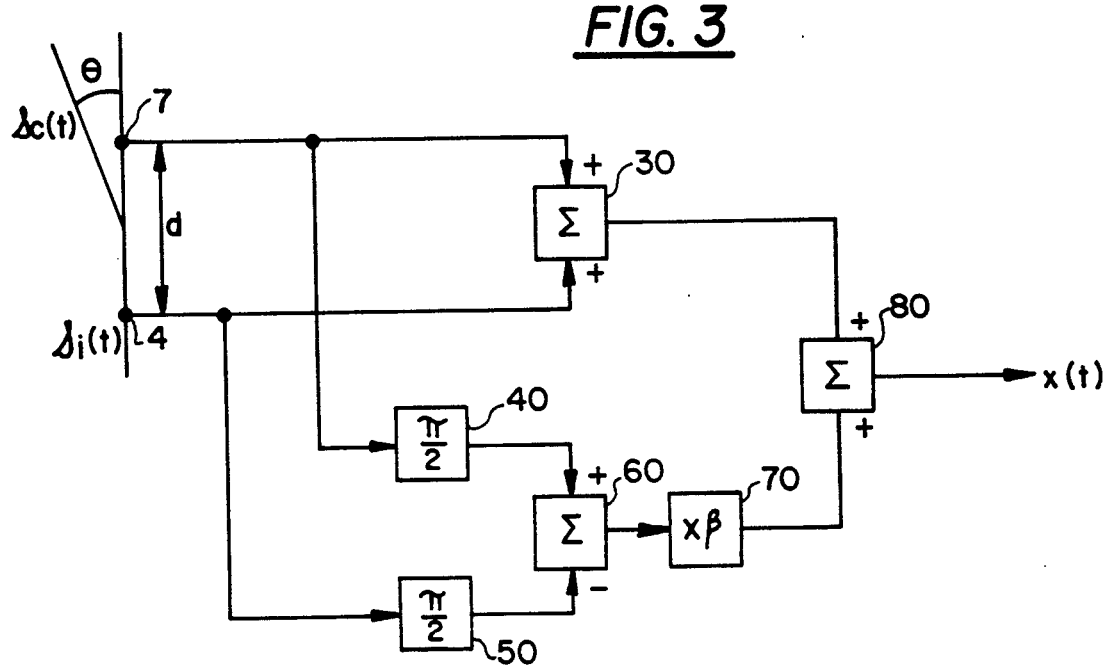

Other features and advantages of the invention will appear clearly from the following description, given by way of a non-restrictive example, with reference to the appended figures, which represent:

FIG. 1, a view in perspective of a sonar according to the invention;

FIG. 2, a diagram of the positioning of columns 4 and 7 of FIG. 1;

FIG. 3, an electronic circuit diagram of the signals coming from these columns.

In the embodiment represented in FIG. 1, the sonar comprises a body 1, kept in a vertical position at the end of a cable 8 which enables it, for example, to be let down from a helicopter to the water. Around this body, there is a set of folding arms 2, which get housed in folded-up position in a set of housings 9, located longitudinally along generatrices of the body 1. Each arm 2 comprises two rods 3 fixed at one end by two joints 5 to the body 1. A first vertical bar 4 is fixed to the other end of the rods 3 by joints 6 so as to form, with the rods 3, a deformable parallelogram located in the vertical plane passing through the axis of symmetry of the buoy, and such that it can get folded up against the body and can get unfolded up to a position where the rods 3 are horizontal and the bar 4 is vertical. One of the rods 3, at least, extends beyond the joint 6 to hold a second bar 7 similar to the bar 4. In order to keep this bar 7 parallel to the bar 4, a brace 10, for example, is used, hinged to these two bars, located towards that of their ends which is opposite the joint 6. The two signals, $S_c(t)$ and $S_i(t)$, are added up in first adder 30. They are phase shifted by $\pi/2$ in two phase shifters 40 and 50, and the signals thus phase shifted are subtracted in a second adder 60. The signal from the adder 60 is multiplied by a coefficient $\beta$ in a multiplier 70, then the signal obtained is added, in an adder 80, to the signal coming from the adder 30.

If $A \cos \omega t$ is the signal received, the resultant signal $x(t)$ delivered by the adder 80 is equal to:

$$x(t) = 2A\cos\omega t \left[ \cos\left(\frac{\pi d}{\lambda}\cos\theta\right) + \beta\sin\left(\frac{\pi d}{\lambda}\cos\theta\right) \right]$$

with $\lambda$ = operating wavelength of the sonar, $$\beta = \cotg\left(\frac{\pi d}{\lambda}\right)$$

for the external cardioid (200) and $$b = -\cotg\left(\frac{\pi d}{\lambda}\right)$$

for the internal diagram (300).

If d is smaller than $\lambda$, and at least smaller than $\lambda/4$, the formula comes down to:

$$x(t) = 2A \cos \omega t (1 + \cos \theta)$$

It is noted, therefore, that the smaller d is, the closer we come to the shape of a cardioid. Nonetheless, we are limited by sensitivity to variations in the characteristics of the transducers, which increases with the value of the coefficient $\beta$.

There are a known way to form a channel pointed in a given direction by delaying (or phase-shifting) the signals of the sensors of an antenna, by a value corresponding to the rephasing of the signals along this direction, and then by summating them.

In then appropriately associating the signals thus processed for all the pairs of columns, we obtain the equivalent of two semi-cylindrical, baffled antennas oriented along the desired channel, one being concave and the other being convex, thus considerably attenuating the drawbacks due to the transparency of the structure of the antenna by greatly reducing the level of the signal received at the rear.

For this, according to the invention, each channel is formed in summating the signals of the hydrophones of each column giving the two signals $s_i(t)$ and $s_c(t)$, and then taking the signals corresponding to the externally oriented cardioids ($+\beta$) for all the pairs of columns located on the same side with respect to a diameter perpendicular to the direction of the channel, namely one half in the example described, and in taking the signals corresponding to the internally oriented cardioids ($-\beta$) for the other half.

This is obtained simply by means of a selection device at the circuit 70.

For example, in FIG. 2, to obtain the channel $V_4$, the external cardioids are used for the arms 1 to 8 and the internal cardioids for the arms 9 to 16. Similarly, for the channel $V_5$, the external cardioids are used for the arms 2 to 9 and the internal cardioids for the arms 10 to 1.

As regards the directivity, in elevation, of the sonar, which is related to the dimension in length of the columns 4 and 7, it can be improved substantially by weighting, in a known way, the spatial distribution of the elementary transducers within each of the columns. In a equally known way, this spatial weighting can be replaced by an electronic weighting of the transducers which are then evenly spaced out in the bar.

By way of an example of a digital embodiment, for a sonar working at 3.5 Khz it is possible to use a mean diameter, of the two crowns of columns, of 1 m, with a spacing d, between the rings, of 7 cm, appreciably smaller than $\lambda/4$ and a columns height of 60 cm.

The invention is not restricted to the example where the columns are located in a crown forming a cylinder with a circular base since, in a known way, the formation of the channels can be done by electronic means for columns arranged on cylinders, the bases of which form all types of curves such as ellipses or various polygons. Similarly, the sonar may be hooked, not only to a helicopter but also to a surface vessel, or may even form an sonobuoy which may be recoverable.

We claim:

1. An unfolding, cylindrical sonar of the type comprising a cylindrical body (1), a set of arms (2) hinged on the body and each bearing a set of columns (4, 7) of transducers, the arms being capable of folding up against the body and of getting unfolded in placing the columns parallel to one another on the generatrices of a set of virtual, cylindrical surfaces, and means for processing the signals from the hydrophones to form at least one transmission and/or reception channel ($V_4$), characterized in that the arms (2) each bear two columns (4, 7) separated by a distance smaller than a quarter of the operating wavelength of the sonar, in that the processing means further comprise means to give each pair of columns of each arm a directivity, in reception and/or transmission which is substantially cardioid, pointed inwards (200) or outwards (300), and in that they also comprise means for the selection, at the level of the formation of channels, of a part of the pairs of double columns, the cardioids of which are pointed inwards, and of the other part of the pairs of double columns, the cardioids of which are pointed outwards, in thus simulating two antenna, one concave and the other convex, pointed in the direction of each channel formed, all the pairs of columns being used to form each channel.

2. A sonar according to claim 1, characterized in that columns (4, 7) are evenly distributed in unfolded position on two cylindrical surfaces with coaxial circular bases and in that the processing means select, for each channel formed, respectively, the cardioids located on one side of the diametral plane of the cylinder perpendicular to the direction of the channel ($V_4$) and the cardioids located on the other side of this diametral plane.

* * * * *